United States Patent [19]
Fayling

[11] 3,753,223
[45] Aug. 14, 1973

[54] SYSTEM TO DETERMINE THE DIRECTIONAL MODE OF TRAVEL OF VEHICLES ON A ROADWAY

[75] Inventor: Richard E. Fayling, White Bear Lake, Minn.

[73] Assignee: Minnesota Mining and Manufacturing Company, St. Paul, Minn.

[22] Filed: Aug. 16, 1971

[21] Appl. No.: 171,904

Related U.S. Application Data

[63] Continuation-in-part of Ser. No. 819,588, April 28, 1969, abandoned.

[52] U.S. Cl. ................................................. 340/32
[51] Int. Cl. ............................................. G08g 1/09
[58] Field of Search ....................................... 340/32

[56] References Cited
UNITED STATES PATENTS
3,044,043   7/1962   Wendt .................................. 340/32
3,493,923   2/1970   Stevens et al. ....................... 340/32

Primary Examiner—William C. Cooper
Attorney—Alexander, Sell, Steldt & Delahunt

[57] ABSTRACT

Method and apparatus for automatically determining within a vehicle the directional mode of the vehicle on a roadway, directional mode being a description of the direction the vehicle is traveling and/or the orientation of the vehicle. The method distinguishes between at least two directional modes, using one or more discrete magnetic-field-producing means installed on roadways and magnetic-flux-sensors in vehicles. The flux-sensors develop a standard first electric signal by travel of the vehicles in a first directional mode over the magnetic-field-producing means and a second electric signal different from the first signal by travel of the vehicles in a second directional mode over the magnetic-field-producing means. Electric circuitry in the vehicles distinguishes between the first and second signals and actuates mechanism in the vehicles that registers the directional mode in which the vehicles are traveling on the roadways. One use of the invention is to limit wrong-way travel on one-way roadways, the second electric signal occurring only when the vehicles are traveling in the wrong direction and the registering mechanism taking the form of travel-inhibiting mechanism that warns a driver or automatically stops the vehicle.

15 Claims, 18 Drawing Figures

Patented Aug. 14, 1973 3,753,223

INVENTOR.
RICHARD E. FAYLING
BY Kinney, Alexander,
Sell, Steldt & De La Hunt
ATTORNEYS Patented Aug. 14, 1973 3,753,223

INVENTOR
RICHARD E. FAYLING
BY Kinney, Alexander,
Sell, Steldt & DeLaHunt
ATTORNEYS Patented Aug. 14, 1973

INVENTOR.
RICHARD E. FAYLING
BY Kinney, Alexander,
Sell, Steldt & DeLaHunt
ATTORNEYS

SYSTEM TO DETERMINE THE DIRECTIONAL MODE OF TRAVEL OF VEHICLES ON A ROADWAY

REFERENCE TO RELATED APPLICATION

This application is a continuation-in-part of my co-pending application, Ser. No. 819,588 filed Apr. 28, 1969, now abandoned.

Wrong-way travel of vehicles on one-way roadways presents a serious safety hazard. In an attempt to limit such travel the number and conspicuity of wrong-way warning signs has been increased--signs being placed on both sides of an entrance to a one-way roadway, and larger and more conspicously colored signs being used, for example. In another approach, two or more coils of conductors are embedded in, and closely spaced along the length of, entrances and exits to one-way roadways. When a vehicle travels over the coils, the change in magnetic field produced by the effect of the vehicle on the earth's magnetic field induces electric signals in the coils. If the sequence of the sgnals generated accords with the wrong direction of travel, mechanism associated with the coils actuates lights or signs along the roadway designed to warn the driver. An installation of coils in roadways capable of generating the needed warning signals is illustrated in Barker, U.S. Pat. No. 2,441,554. Osmond, U.S. Pat. No. 3,431,553 shows another technique for automatically activating a roadside warning device when a vehicle enters a one-way roadway from the wrong way.

While these previous methods make roadsign warnings to wrong-way drivers more dramtic than the warnings provided by conventional placement of roadsigns, they still depend on observation and recognition by the drivers of signs or signals on the side of a roadway, and as a result, they still permit human error to lead to wrong-way travel. Further, the latter methods are of dubious practicality, since they require apparatus at each entrance to a one-way roadway that is expensive to install, (a source of electric power is required), operate, and maintain, and insofar as is known such methods have never approached actual use.

The present invention provides methods and apparatus for automatically determining within a vehicle the directional mode of the vehicle on a roadway, and one important use of such an automatic determination is to prevent the vehicle from traveling the wrong way on a one-way roadway. By "directional mode" is meant the direction and/or orientation in which a vehicle is traveling in a linear path on the roadway. For example, the vehicle may be moving in either of two directions on the roadway, which are arbitrarily labeled positive and negative for purposes herein. Further, the vehicle may be in either of two orientations, forward-moving, in which the front end of the vehicle is facing in the direction the vehicle is moving, or backward-moving, in which the back end of the vehicle is facing in the direction the vehicle is moving. As will be seen, there are four combinations of direction of movement and orientation. For some embodiments of the invention, the method and apparatus of the invention need choose between only two directional modes. For example, to prevent wrong-way travel, it is only necessary to determine in which direction a vehicle is traveling. In other embodiments of the invention, the method and apparatus distinguish between all four different combination directional modes and determine which one the vehicle is in.

Briefly, a method of the invention comprises a) installing one or more discrete magnetic-field-producing means on the roadway each adapted to develop in a magnetic-flux-sensor in a vehicle traveling on the roadway a standard first electric signal for travel of the vehicle in a first directional mode on the roadway and a standard second electric signal different from the first signal for travel of the vehicle in a second directional mode on the roadway; b) equipping a vehicle traveling on a roadway with magnetic-flux-sensing means adaptee to develop said signals; c) equipping the vehicle with mehanism adapted to register the directional mode of travel of the vehicle; and d) equipping the vehicle with electric circuity electrically connected between the flux-sensing means and the registering mechanism and adapted to distinguish between the first and second electric signals and to actuate the registering mechanism in accordance with which of the signals is generated in the flux-sensing means.

As applied to limit wrong-way travel, the flux-sensing means and magnetic-field-producing means are designed to determine the direction the vehicle is traveling, usually assuming forward orinetation of the vehicle. The mechanism that registers the directional mode, in this case, the direction, the vehicle is traveling comprises travel-inhibiting mechanism that is actuated if the "wrong" signal (for example, the second electric signal) is ever generated in the flux-sensing means. Useful travel-inhibiting mechanisms include horns, buzzers, or flashing lights within the vehicles, which a driver could hardly fail to notice, or, in totally automatic systems, mechanisms that automatically stop the vehicles.

Several other desirable objectives also may be obtained as a result of automatic determination within a vehicle traveling on a roadway of the directional mode of the vehicle. For example, when vehicles such as driverless carts in a factory are operating under the control of an automatic guidance system, various operations to be performed by the vehicle, or the route to be taken by the vehicle, or a mode of operation for the vehicle, will vary depending on the directional mode of the vehicle. Or automatic control apparatus in airplanes traveling on a runway or other part of an airfield may automatically operate according to the directional mode of the airplane. The present invention provides a basis for such automatic operations by conveniently, reliably, and automatically traveling on the roadway.

The magnetic-field-producing means used according to the invention generally take the form of one or more magnets or current-carrying electrical conductors installed on the roadways. When the object is to limit wrong-way travel, the magnetic-field-producing means should be applied at least at exits from one-way roadways, generally transverse to tht path of travel. The resulting set of magnetic-field-producing means each develop standard first and second signals as described above, a standard signal being a whole signal or a component of a larger signal having a characteristic feature that is substantially common to all the signals and is recognizable by sensing apparatus. Magnetic-field-producing means may also be applied at locations over the whole length of the roadway for wrong-way control or other purposes. And for other uses of automatic determination of vehicle-direction, a track comprised of regularly spaced magnetic-field-producing mPans extending over at least a part of the length of a roadway and adapted to regularly or continually provide information to a vehicle traveling on the roadway may be desirable (regularly not necessarily meaning constant but according to an established scheme). Such a track may have other uses in the system beside indicating direction; it may provide a basis for determining the speed a vehicle is traveling on the roadway or provide steering control, for example.

As will be seen, the difference in signal used in a method of the invention may be of different kinds. For single magnets the signals will simply differ in the sign and/or wave form of a particular component of a signal pulse generated. For example, travel of a flux-sensor in one direction over a magnet having north and south poles spaced along the length of the roadway may result in a signal pulse having a component of positive sign (+) followed by a component of negative sign (−), and travel in the opposite direction will cause the signal to be a −, + signal. When magnetic-field-roducing means comprising more than one magnet longitudinally spaced along the roadway are used, the signals may also differ in the order of individual components of the whole signal. For example, a track may develop in a flux-sensor a set of +, −, +, −, −, + electric pulses when the flux-sensor is traveling in one direction, and a set of +, −, −, +, −, + pulses when the flux-sensor is traveling in the opposite direction; or in a different case the set of signals may be described as +, −, +, −, space, + , − in one direction and −, +, space, −, +, −, + in the opposite direction.

As previously noted, the invention can be used to determine the forward or backward orientation of a vehicle, in addition to or instead of indicating the direction of travel. Such a determination is useful, for example, to provide information in the form of electric signals that provide a basis for certain autoamtic operations. For example, a vehicle traveling forward in one direction on a roadway may have operations to perform, or may be automatically guided in a way different from what would be the case if the vehicle was traveling backward in that direction. The forward or backward orinetation of a vehicle may be determined by using horizontal-axis flux-sensors (their axis generally extending either transverse or parallel to the longitudinal axis of the roadway, whichever senses the largest part of the magnetic fields from the magnetic-field-producing means in the roadway) or by using one or more flux-sensors displaced from the center of the track. When a horizontal-axis flux-sensor is rotated 180°, as occurs when the vehicle on which the sensor is mounted is rotated 180°, and caused to traverse a magnetic field in the same direction as before rotation, the signal developed in the sensor will be inverted from what it was before rotation. That is, the sign of the components of the signal will be reversed. An off-center sensor can detect differences in the direction the vehicle on which it is mounted is facing--when the vehicle is centered on the track--because the sensor follows a different path, on the opposite side of the center of the track.

With respect to tracks of spaced magnetic-field-producing means, such tracks should not exhibit bidirectional symmetry if they are to be useful in determining the direction of motion of vehicles having the same orientation, for example, forward-moving vehicles. Bi-directional symmetry exists when a hypothetical rotation of one track 180° about a vertical axis extending through a central point on the track, plus, possibly, a slight longitudinal translation, would make the arrangement of magnetic fields above the track to be identical to what it was before rotation. Only when the track is not bidirectionally symmetrical will the electric signals developed in sensors of the same orientation traveling over the track differ depending on the direction the sensor is traveling.

If a track that does not exhibit bidirectional symmetry is used in combination with, for example, a horizontal-axis sensor, it may be possible to generate a different signal in the sensor for each of the four different combination directional modes. However, with some bidirectionally asymmetric tracks, the invention of signal in a horizontal-axis coil due to a reverse in orientation of the vehicle combines with an inversion in signal due to a change in direction of traversal to cancel any change in the signal.

While others have suggested installation of magnets or current-carrying electrical conductors in roadways to provide control information to vehicles traveling on the roadways (see, for example, Stevens et al., U.S. Pat. No. 3,493,923 Ferrill, U.S. Pat. No. 2,493,755, and Adler, U.S. Pats. No. 1,803,288 1,803,292), no one has previously recognized that such installations could be used to indicate the directional mode in which a vehicle is traveling or to limit wrong-way travel on one-way roadways. Nor has anyone taught what the nature of the installation on the roadways or the nature of mechanism in vehicles should be to determine directional mode or to limit wrong-way travel. The present invention offers a potentially significant advance in safety over any previously available method for limiting wrong-way travel, and its automatic features make it available to control traffic on a wide variety of roadways; for purposes of this specification the term "roadway" includes all land surfaces on which vehicle travel, including streets and highways, driveways, parking lots, airport runways, corridors or open floors within buildings, and the like.

In preferred embodiments, the magnetic fields above the roadways are provided with polymer-based magnets. Magnets of this type generally comprise a tough organic polymeric matrix and particles of magnetic material such as barium ferrite uniformly distributed through the matrix. A preferred polymer-based magnet material producing strong magnetic fields is described in several patents of Blume, including U.S. Pat. Nos. 2,999,275 and 3,359,152. As taught in those patents, substantially domain-size anisotropic magnetic particles are oriented during the process of manufacture, placing their preferred magnetic axes in substantially parallel alignment so that the magnet material is itself anisotropic.

Polymer-based magnet materials offer several advantages for use on roadways in this invention. They are readily made into integral units that provide the whole necessary field at one location on a roadway, and they are adapted to convenient and inexpensive installation on roadways. In one method of installation, somewhat flexible and resilient sheets or tapes of a polymer-based magnet material are installed either edgewise or flat in channels cut in the surface of the roadway. Polymer-based magnet materials are also of advantage because they are highly resistant to fracture or other deterioation under the stresses that occur within roadways as a result of daily and seasonal temperature variations. The use of polymer-based magnets in roadways is more fully described in my copending patent application, Ser. No. 819,836, filed Apr. 28, 1969, now U.S. Pat. No. 3,609,678, and the teachings of that patent are incorporated herein by reference.

While polymer-based magnets have many advantages in this invention, other means are also useful to form magnetic fields that develop different signals in a flux-sensor for different directional modes of travel of the flux-sensor through the field. For example, individual permanent bar magnets or sets of such magnets, such as ceramic or alnico magnets, are useful, as are current-carrying electrical conductors installed across the lane or lanes of travel of the roadway. Magnetized stripes of magnetizable paint are also useful. In general, magnetic-field-producing means of this invention are installed at least in the central part of the lane or lanes of travel that are to be contolled, though for best results they extend across substantially the whole lane or lanes being controlled.

IN THE DRAWINGS

FIG. 16 illustrates a vehicle traveling over a magnetic-field-producing means of the invention.

DETAILED DESCRIPTION

Figure 1:
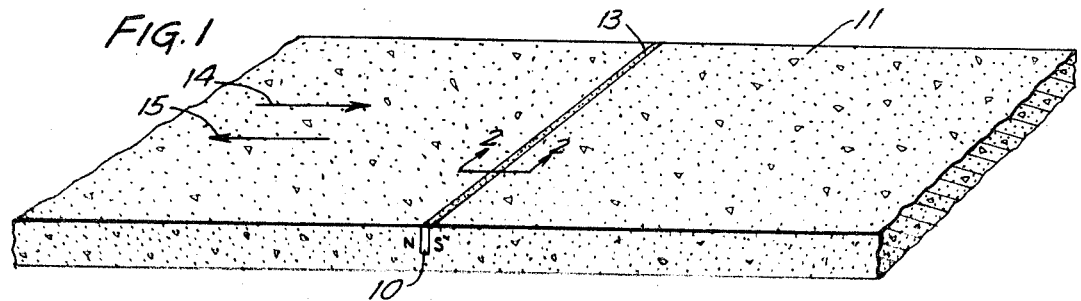
FIGS. 1 and 5–8 are schematic perspectives of installations of magnetic-field-producing means of this invention.
Figure 2:
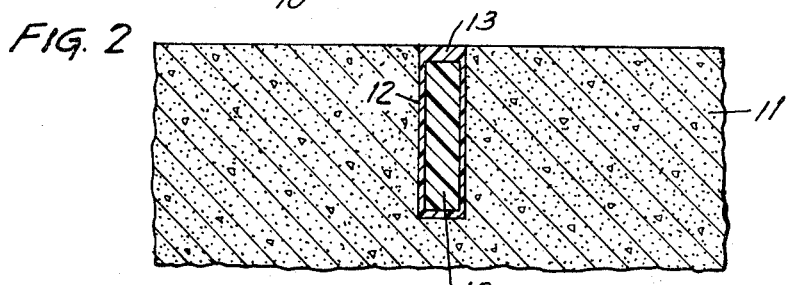
FIG. 2 is a section through the installation of FIG. 1 taken along the lines 2—2 in FIG. 1.

Some of the installations of useful magnetic-field-producing means of this invention are shown in the drawings. FIG. 1 is an illustration of an installation of magnetic-field-producing means according to this invention using a length 10 of a tape or narrow sheet of polymer-based magnet material installed edgewise in the pavement 11. The anisotropic magnetic particles in the length of tape 10 are oriented so that their preferred magnetic axes are parallel to the length of the roadway; the magnet thus exhibits a north pole on one of its large-area faces and a south pole on the opposite large-area face. As illustrated in FIG. 2, the tape 10 is adhered into a channel 12 cut in the roadway with a flexible, resilient, and adherent potting compound 13.

Figure 3A:
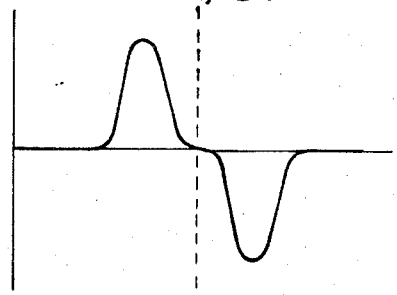
FIGS. 3 and 9 are graphs of the electric signal developed in a flux-sensor as it traverses representative installations of magnetic-field-producing means of this invention from different directions.
Figure 3B:
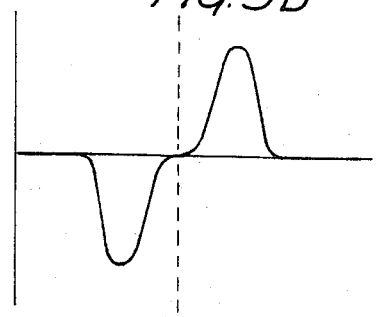

FIGS. 3A and 3B are illustrative graphs of the two different signals generated in one typical kind of flux-sensor, such as a horizontal-axis coil, in a vehicle traveling forward and in both directions over an installation such as that shown in FIG. 1. The voltage of the signal is represented on the vertical axis and time is represented on the horizontal axis; FIG. 3A is a graph of the signal generated when the vehicle travels in the direction of the arrow 14 in FIG. 1 while FIG. 3B is a graph of the signal developed when the vehicle travels in the direction of the arrow 15 in FIG. 1. The dotted line in the two figures represents the time at which the flux-sensor crosses the center of the magnet 10. As shown the sign of the component of the signal initially generated in a flux-sensor as it approaches the magnet 10 differs depending on the direction of approach.

Figure 4:
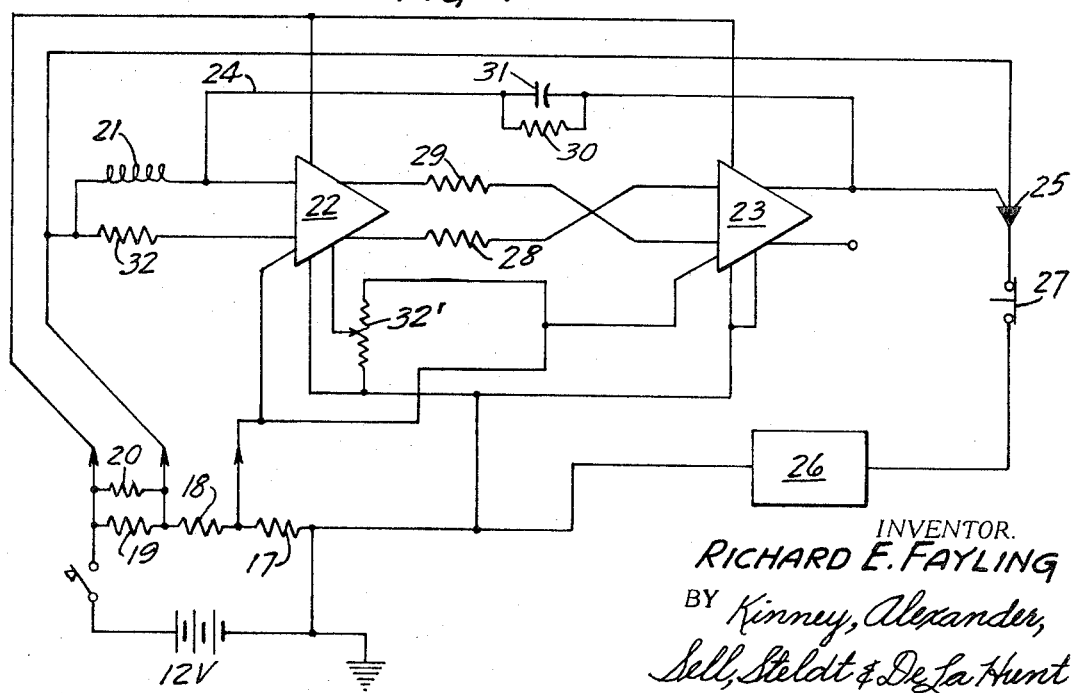
FIG. 4 is a schematic diagram of an illustrative electrical circuit of this invention.

FIG. 4 shows one example of an electrical circuit used to sense the signal developed within the flux-sensor and to actuate travel-inhibiting mechanism within the vehicle. This illustrative circuit is supplied from a 12 volt battery in the vehicle through a voltage-dividing network comprising resistors 17, 18, 19, and 20. the circuit includes the coil 21 of the flux-sensor in the ehicle, two operational amplifiers 22 and 23, and an R-C circuit branch 24. The amplifiers and R-C circuit branch in combination amplify and integrate any signal pulse generated in the coil 21. A signal such as shown in FIGS. 3A or 3B is amplified and integrated to produce a pulse of only one sign, the sign being the same sign as the initial component of the signal. The amplified and integrated signal pulse travels to a gate-switch 25, such as a programmable unijunction transistor, silicon controlled rectifier, gas discharge lamp, and the like which is biased so as to be triggered only by a pulse of one sign, for example, a negative pulse. When the pulse of appropriate sign triggers the gate-switch 25, a current flows through an alarm device 26 to actuate the alarm device. The alarm device continues to operate until a reset switch 27 is opened, whereupon the gate-switch 25 closes.

Figure 5:
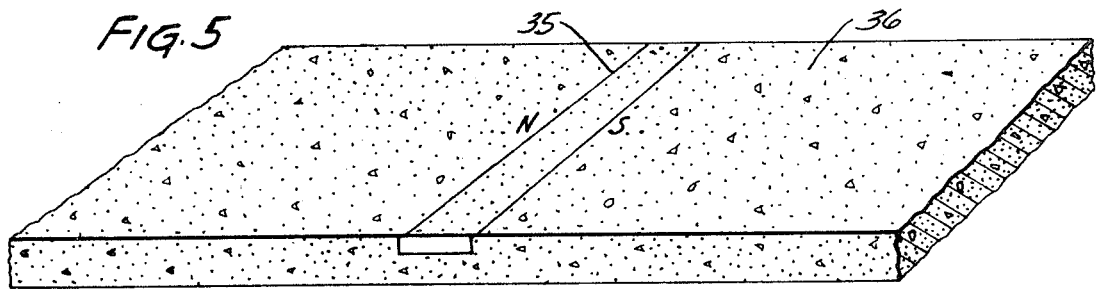

FIG. 5 is an illustration of an alternative installation of a polymer-based sheet or tape magnet 35, which is installed flat in a shallow channel cut in the roadway 36. The anisotropic magnetic particles in the magnet are arranged so that their preferred magnetic axes are parallel to the length of the roadway, presenting a north pole at one edge of the magnet and a south pole at the opposite edge of the magnet. This magnet installation thus provides a field similar to that of the installation in FIG. 1 and is useful in the same manner with the same circuitry as described for the installation shown in FIG. 1.

Figure 6:
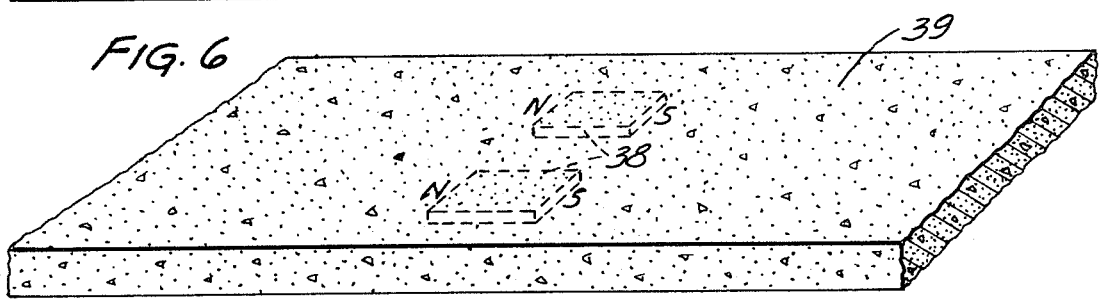
Figure 7:
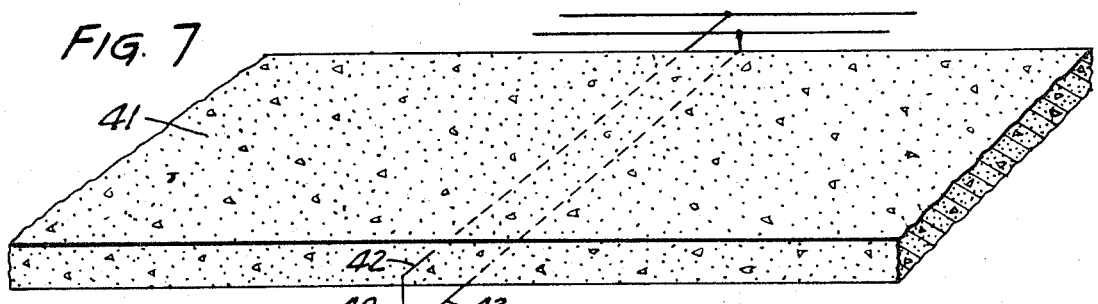

FIGS. 6 and 7 illustrate additional installations of magnetic-field-producing means that produce magnetic fields similar to that of the installation illustrated in FIG. 1. In FIG. 6 separate permanent bar magnets 38, such as ceramic or alnico magnets, are embedded in individual recesses in the roadway 39. In FIG. 7 a current-carrying conductor 40 is embedded beneath the surface of a roadway 41 as a loop lying in a vertical plane; one leg 42 of the loop is near the surface of the pavement and provides the useful magnetic field above the surface of the roadway, and the second leg 43 of the loop is a substantial distance below the first leg so that the second leg's magnetic field does not interfere with the useful field above the surface of the roadway.

Figure 8:
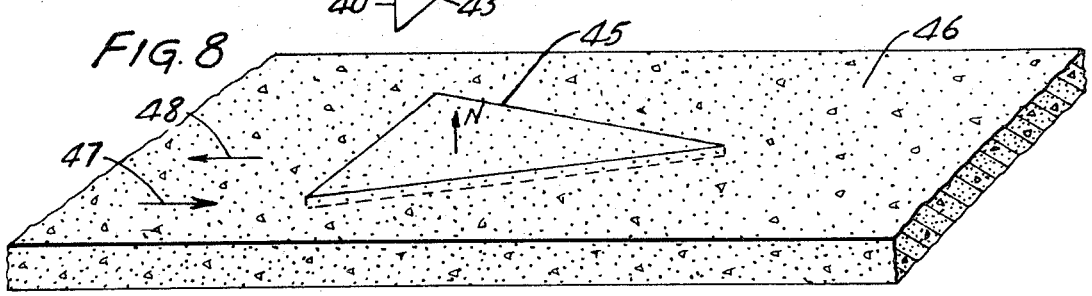
Figure 9A:
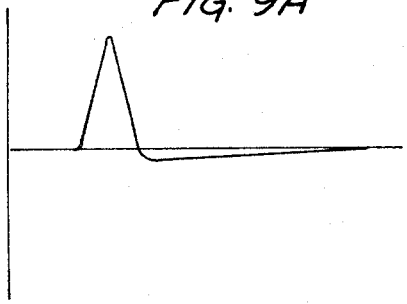
Figure 9B:
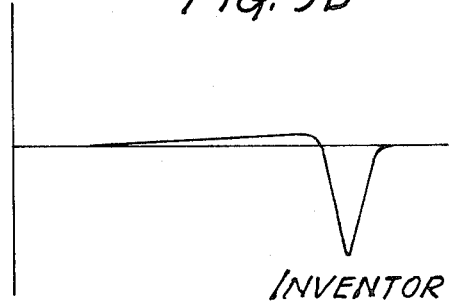

FIG. 8 illustrates an installation of a polymer-based magnet 45 formed in a distinctive shape that visually informs drivers traveling on the roadway 46 as to the proper direction of travel. The magnet 45 is shaped as an arrowhead, with the preferred magnetic axes of the particles within the magnet perpendicular to the surface of the roadway, so that the magnet exhibits a north or south pole on the exposed face of the magnet. Since the magnet's shape is asymmetrical with respect to a line transverse to the length of the roadway, the signal induced in flux-sensors traveling through the field above the magnet will be different for each direction of its travel. FIG. 9A illustrates the signal induced in a vertical-axis-coil flux-sensor traveling in the direction of the arrow 47 in FIG. 8, while FIG. 9B illustrates the signal induced in such a flux-sensor traveling in the direction of the arrow 48 in FIG. 8. Electric circuitry similar to that shown in FIG. 4 is useful to actuate travel-inhibiting mechanism within a vehicle traveling over an installation such as shown in FIG. 8. And if a horizontal-axis coil is used, a magnet installation such as shown in FIG. 8 is useful to distinguish between all four combination directional modes of travel.

Figure 10:
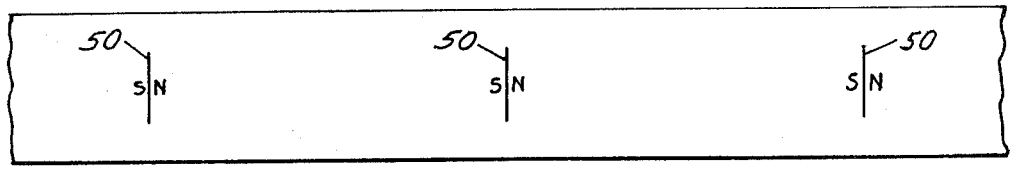
FIGS. 10–15 are schematic top views of roadways having tracks of magnetic-field-producing means useful according to the invention, the magnetic-field producing means comprising narrow sheets or tapes of polymer-based magnets embedded edgewise in the roadway.
Figure 11:
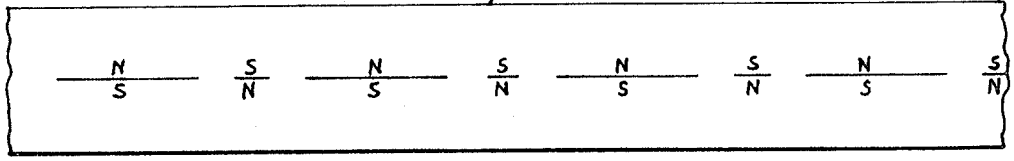
Figure 12:
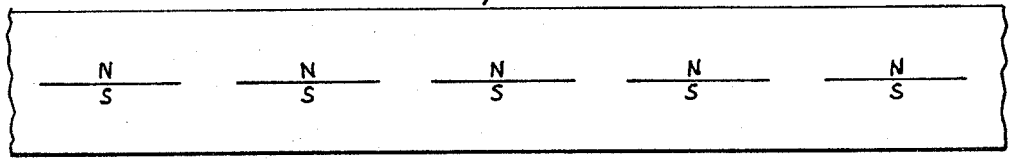
Figure 13:
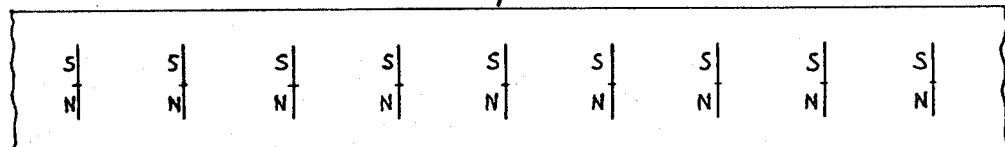
Figure 14:
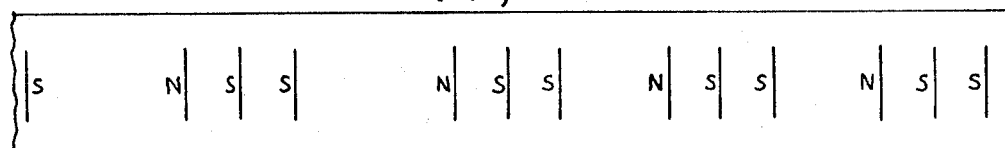
Figure 15:
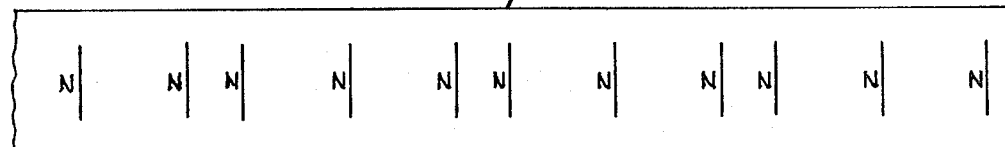
Figure 15:
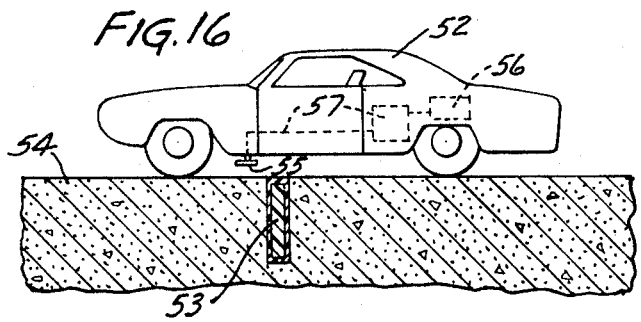

FIGS. 10–15 show tracks consisting of several narrow sheets of polymer-based magnet material embedded edgewise in the roadway and regularly spaced along the length of a roadway (when "N" or "S" appear together on opposite sides of the line as in FIGS. 10–12, they represent horizontal magnetization; when used alone adajcent a line in the drawing as in FIGS. 13–15, they represent vertical magnetization). None of the illustrated tracks exhibit bidirectional symmetry, though if the magnets 50 in the track of FIG. 10 were spaced closer than about twice the height of the sensor above the magnets, there would not be a sufficiently precise distiction between the different wave patterns produced by different directions of travel for electric sensing apparatus to accurately and reliably recognize such a lack of symmetry.

It will be noted that in the track illustrated in FIG. 11 two magnets comprise one discrete magnetic-field-producing means of the invention adapted to develop in a flux-sensor traveling over the track one signal for travel in one direction and a different signal for travel in the opposite direction. In FIGS. 10, 12, and 13 one discrete magnetic-field-producing means consists of one magnet, though in FIG. 13 the one magnet has different polarities for the two sections of the magnet. In FIGS. 14 and 15 three magnets comprise one discrete magnetic-field-producing means.

When sensed with vertical-axis coils, the tracks of FIGS. 10, 14, and 15 will indicate the direction a vehicle is traveling independent of orientation of the vehicle, and by the same token will not indicate orientation of the vehicle. (Vertical-axis coils would generally not be used with the tracks of FIGS. 11 and 12 for purposes of this invention since they measure too little of the magnetic field). When sensed with an off-center vertical-axis coil, the track of FIG. 13 will indicate in which direction a vehicle is facing. since different signals will be developed in the coil only when the vehicle is facing in different directions; when a vehicle is facing in a certain direction, the same signal will be developed, no matter which direction the coil is moving. Direction can be sensed with an off-center vertical-axis coil and the track of FIG. 13 if it is assumed that the vehicle is in a certain orientation (for example, is forward moving), since determining the direction the vehicle is facing determines the direction it is moving.

In the case of horizontal-axis coils, the tracks of FIGS. 10–12 also develop signals that indicate the direction the vehicle is facing, and if a certain orientation is known or assumed, such a determination will indicate direction of movement (a transverse-axis coil would be used with the track of FIGS. 11 and 12, since there are no magnetic field components along the long dimension of the magnets of these tracks, while a longitudinal-axis coil would be used with the track of FIG. 10). If horizontal-axis coils are used with the tracks of FIGS. 14 and 15, different signals will be developed for each of the four combination directional modes; that is, a different direction of movement over the magnetic-field-producing means of these tracks develops different signals and the signal inversion caused by reversing the direction the sensor is facing also changes the signals.

Because a vertical-axis sensor can detect direction of motion directly from the track of FIG. 10, and a horizontal-axis sensor can detect in which direction the vehicle is facing, a combined sensor means including these two sensors, or, alternatively, a single sensor oriented obliquely between horizontal and vertical can also be used to determine all four directional modes. Horizontal sensors oriented obliquely between transverse and longitudinal are also useful according to the invention. Often the sensors are coils, though Hall probes, magnetometers, magneto diodes, biased reed switches, etc. also may be used, each kind usually having horizontal-axis types and vertical-axis types.

It will be noted that the illustrated magnetic-field-producing means useful to distinguish between four directional modes using only horizontal-axis sensors either exhibit geometric asymmetry about a line transverse to the length of the roadway (as in the case of the magnet installation of FIG. 8) or include three magnet sections or components, at least two of which are of different polarity (as in the case of FIG. 14) or are spaced an amount different from the spacing between the other two sections (as in the case of FIG. 15). It will also be noted that if the track of FIG. 13 includes a magnet of one polarity extending across the length of the track between each of the presently illustrated magnets, the track would comprise magnetic-field producing means having three magnet sections, at least two of which are of different polarity. Such a track would be useful to distinguish between four directional modes.

It should also be noted that the magnetic-field-producing means useful to indicate directional mode according to this invention may not be the only magnetic-field-producing means on the roadway. Other magnetic-field-producing means may be included, as interspersed with magnetic-field-producing means useful in this invention, in a track extending along a roadway to serve as location codes, to provide additional information to the vehicles, or to provide speed or steering control. Further, magnetic-field-producing means useful in this invention may be useful to perform these other functions also.

FIG. 16 illustrates a vehicle 52 that incorporates apparatus according to the invention and is traveling over a magnetic-field-producing means 53 installed in a roadway 54. The vehicle includes a magnetic-flux-sensor 55, mechanism 56 for registering the directional mode of travel of the vehicle, and electric circuitry 57 connected between the flux-sensor 55 and mechanism 56 adapted to distinguish between different electric signals developed in the flux-sensor and to actuate the registering mechanism in accordance with the signal developed.

The invention may be further illustrated by the following example of a wrong-way warning system using a roadway of this invention. Three 3-inch-wide, 24-inch long, one-fourth-inch-thick sheets of Plastiform brand magnet (having a nitrile rubber matrix loaded with about 65 volume-precent of barium ferrite particles and an energy product of about one megagauss oersted and exhibiting a compressive yield strength of 3,750 pounds per square inch, a modulus of elasticity in compression of about 30,700 pounds per square inch, a Shore D hardness of 65, an ultimate tensile strength of 640 pounds per square inch, a modulus of elasticity in tension of 65,800 pounds per square inch, an ultimate elongation of 3.25 percent, and an ultimate shear strength of 1560 pounds per square inch) were embedded edgewise in transverse channels spaced 50 feet apart along the length of an asphalt roadway in the manner illustrated in FIGS. 1 and 2. The channels has been formed in the asphalt roadway by an abrasive saw, and the magnets were sealed in the channels with a potting compound that comprised 50 weight-percent of a diglycidyl ether of bisphenol A having an epoxide-equivalent weight of 190 (Epon 828) and 50 weight-percent of the reaction product of a polyamine and a dimerized acid, the reaction product having an amine value of 345 and a viscosity at 75°C. of 8 poises (Versamid 125). The magnets each exhibited a field of over 500 gauss at the surface of the roadway and a field of about 0.5 gauss 10 inches above the roadway.

An automobile was equipped with a flux-sensor in the form of a coil having about 4000 rectangular turns (12.5 inches by 1.5 inches) of No. 49 gauge copper wire; the coil had a height of about 0.4 inch, and was arranged with its axis perpendicular to the surface of the roadway and it was spaced about 10 inches from the roadway. The coil was connected to an alarm through the circuit illustrated in FIG. 4 in which the operational amplifiers were DC amplifiers supplied by RCA as Model No. CA 3000, the programmable transistor was a D13T2 transistor supplied by General Electric, the alarm was a Mallory SC628, "Sonalert," the resistors 28 and 29 both had resistances of 10,000 ohms, the resistor 30 had a resistance of 10 megaohms, the capacitor 31 had a capacitance of 0.05 microfarads, the resistor 32 has a resistance of 1000 ohms, and a potentiometer 33 used to adjust the voltage biasing the operational amplifier 22, had a resistance of 1000 ohms. The resistors 17, 18, 19, and 20 had resistances of 22, 5.6, 33, and 33 ohms respectively. When the auto was driven along the roadway in a first direction at various speeds ranging from 15 to 50 miles per hour, the alarm did not sound as the auto crossed the magnet; but when the auto was driven at the same speeds in the opposite direction along the roadway, the alarm sounded each time the auto crossed each of the magnets.

The magnets were installed in the roadway and tested in the general manner described in early August. Periodically during the following winter through late April, a vehicle having the apparatus described was driven over the installations. Each time, the alarm was silent for travel of the flux-sensor in the "correct" direction and each time the alarm sounded for travel of the flux-sensor in the "wrong" direction. Though the installation was at Saint Paul, Minnesota where there was a heavy snowfall during the winter, requiring plowing of the roadway numerous times, there was no visible deterioation of the installation.

What is claimed is:

1. A method for determining in which of at least two different directional modes a vehicle is traveling on a roadway comprising A. installing one or more discrete magnetic-field-producing means on the roadway each adapted to provide a magnetic field that may be sensed by magnetic-field-sensing means traveling over the roadway and through said field to develop in said magnetic-field-sensing means at least a standard first electric signal for travel in a first directional mode and a standard second electric signal different from the first signal for travel in a second directional mode;
    B. equipping the vehicle with magnetic-field-sensing means adapted to develop said signals;
    C. equipping the vehicle with mechanism adapted to register the directional mode of travel of the vehicle; and
    D. equipping the vehicle with electric circuitry electrically connected between the magnetic-field-sensing means and the registering mechanism and adapted to distinguish between the first and second electric signals and to actuate the registering mechanism in accordane with which of the signals is generated in the magnetic-field-sensing means.

2. The method of claim 1 in which the discrete magnetic-field-producing means is at least one magnet comprising a tough organic polymeric matrix and particles of magnetic material uniformly distributed through the matrix.

3. The method of claim 2 in which said magnet extends transverse to the length of the roadway over at least a substantial width of the roadway.

4. The method of claim 1 in which the discrete magnetic-field-producing means is at least one magnet shaped in a configuration that is asymmetrical with respect to a line transverse to the length of the roadway.

5. The method of claim 1 in which the discrete magnetic-field-producing means is a current-carrying electrical conductor extending transverse to the length of the roadway.

6. The method of claim 1 in which a plurality of discrete magnetic-field-producing means are regularly spaced along the length of the roadway and constitute a track continually providing information to vehicles traveling on the roadway, the track being characterized in that it does not exhibit bidirectional symmetry.

7. The method of claim 1 for limtiing wrongway travel on a one-way roadway in which the magnetic-field-sensing means develops different electric signals for different directions of travel through the magnetic field provided by said magnetic-field-producing means; the registering mechanism comprises travel-inhibiting mechanism; and the travel-inhibiting mechanism is actuated when an electric signal corresponding to the "wrong" direction of travel is developed in the magnetic-field-sensing means.

8. The method of claim 7 in which the travel-inhibiting mechanism automatically stops the vehicle when an electric signal corresponding to the "wrong" direction of travel is developed in the magnetic-field-sensing means.

9. The method of claim 1 for determining in which of four directional modes a vehicle is traveling on a roadway, chacterized in that the magnetic-field-sensing means comprises a horizontal-axis sensor, and the magnetic-field-producing means provides a magentic field such that four different standard electric signals are developed in said magnetic-field-sensing means for travel of the magnetic-field-sensing means in four different directional modes.

10. The method of claim 9 in which the magnetic-field-producing means a) exhibits geometric asymmetry with respect to a line transverse to the length of the roadway or b) comprises at least three magnetic-field-producing sections, at least two of which are of different polarity or are spaced an amount different than the other sections are spaced.

11. The method of claim 1 for determining in which of four directional modes a vehicle is traveling on a raodway, characterized in that the magnetic fueld sensing means comprises two sensors with perpendicularly oriented axes, or a single sensor with an obliquely oriented axis.

12. Apparatus for installation in a vehicle to determine the directional mode of the vehicle when the vehicle is traveling on a roadway equipped with one or more discrete magnetic-field-producing means each adapted to provide a magnetic field that may be sensed by magnetic-field-sensing means traveling over the magnetic-field-producing means and through said field to develop in said magnetic-field-sensing means at least a standard first electric signal for travel in a first directional mode and a standard second electric signal different from the first signal for travel in a second directional mode; the apparatus comprising A. a magnetic-field-sensing means adapted to be installed on the vehicle in position to develop said signals;

B. mechanism adapted to register the directional mode of travel of the vehicle; and C. electric circuitry electrically connected between the magnetic-field-sensing means and the registering mechanism and adapted to distinguish between the first and second electric signals and to actuate the registering mechanism in accordance with which of the signals is generated in the magnetic-field-sensing means.

13. Apparatus of claim 12 for limiting wrong-way travel on one-way roadways in which the magnetic-field-sensing means develops different signals for different directions of travel of the vehicle, and the registering mechanism comprises travel-inhibiting mechanism actuated when an electric signal corresponding to the "wrong" direction of travel is developed in the magnetic-field-sensing means.

14. Apparatus of claim 13 in which the travel-inhibiting mechanism automatically stops the vehicle when an electric signal corresponding to the "wrong" direction of travel is developed in the magnetic-field-sensing means.

15. In combination, a vehicle and apparatus of claim 12 installed on the vehicle.

* * * * *